United States Patent

Makram-Ebeid

[11] Patent Number: 5,872,861
[45] Date of Patent: Feb. 16, 1999

[54] DIGITAL IMAGE PROCESSING METHOD FOR AUTOMATIC DETECTION OF STENOSES

[75] Inventor: Shérif Makram-Ebeid, Dampierre, France

[73] Assignee: U.S. Philips Corporation, New York, N.Y.

[21] Appl. No.: 771,876

[22] Filed: Dec. 23, 1996

Related U.S. Application Data

[63] Continuation of Ser. No. 278,480, Jul. 20, 1994, abandoned.

[30] Foreign Application Priority Data

Jul. 22, 1993 [FR] France ................................. 93 09055

[51] Int. Cl.⁶ ........................................................ G06K 9/46
[52] U.S. Cl. ............................ 382/130; 382/199; 128/922
[58] Field of Search ............................ 382/128, 130–132, 382/259, 155, 156, 159, 190, 197, 199; 128/653.1, 653.4, 654, 659, 668, 922

[56] References Cited

U.S. PATENT DOCUMENTS

| | | | |
|---|---|---|---|
| 4,692,864 | 9/1987 | Shimoni et al. | 364/414 |
| 4,875,165 | 10/1989 | Fencil et al. | 364/413.22 |
| 5,056,524 | 10/1991 | Oe | 128/654 |
| 5,148,500 | 9/1992 | Belanger | 382/55 |
| 5,261,012 | 11/1993 | Hardy et al. | 382/55 |
| 5,272,763 | 12/1993 | Maruyama et al. | 382/8 |
| 5,274,714 | 12/1993 | Hutcheson et al. | 382/15 |
| 5,357,550 | 10/1994 | Asahina et al. | 378/98.5 |
| 5,368,033 | 11/1994 | Moshfeghi | 128/653.4 |
| 5,384,905 | 1/1995 | Tanaka et al. | 395/143 |

OTHER PUBLICATIONS

"Automated Identification of Vessel Contours in Coronary Arteriograms by an Adaptive Tracking Algorithm" Y. Sun, IEEE Trans. on Med. Imaging vol. 8 No. 1, Mar. 1989, pp. 78–88.

Optimization of Morphological Structuring Elements for Angiogram Ehnamcement Keith M. Andress and David L. Wilson, SPIE vol. 1445, Image Processing, 1991 pp. 6–10.

Primary Examiner—Amelia Au
Assistant Examiner—Larry J. Prikockis
Attorney, Agent, or Firm—Jack D. Slobod; Dwight H. Renfrew, Jr.

[57] ABSTRACT

A method of processing digital angiographic images which enables automatic detection of stenoses includes a tracking step for the identification of pixels or points situated on the central lines of vessels, and a step for the detection of stenoses by measurement of the intensity of pixels along the central lines of the vessels. The stenoses detection step includes a sub-step for deciding whether a pixel zone is a potential stenosis zone when the intensity of its pixels exhibits a local variation so as to assume an intermediate value between the intensity of the pixels to both sides of this zone and the intensity of the pixels of the image background, a sub-step for defining an icon around potential stenosis zones, and a sub-step for the extraction of the pixels of edges of the vessel segments in the icons.

8 Claims, 3 Drawing Sheets

5,872,861

DIGITAL IMAGE PROCESSING METHOD FOR AUTOMATIC DETECTION OF STENOSES

This is a continuation of application Ser. No. 08/278,480, filed Jul. 20, 1994, now abandoned.

RELATED INVENTION

This application is related in subject matter to commonly owned U.S. patent application Ser. No. 08/278,484 entitled "Digital Image Processing Method for Local Determination of the Centre and the Width of Objects in the Form of Contrasting Bands on a Background", having the same inventor as and filed contemporaneously with, this application, now abandoned in favor of continuation application Ser. No. 08721,523, filed Sep. 26, 1996, now U.S. Pat. No. 5,768,405 and which is hereby incorporated herein by reference.

BACKGROUND OF THE INVENTION

1. Field of the Invention

The invention relates to a method for the processing of digital angiographic images which enables automatic detection of stenoses and comprises at least a step for the identification of pixels or points situated on the central lines of vessels, which step is referred to as a tracking step. The invention is used, for example in digital imaging systems in order to facilitate the detection of anomalies, such as stenoses, on the basis of arteriograms of a human or animal body.

2. Description of the Related Art

Arteriograms are special images for the visualization of blood vessels. Various types of arteriograms can be formed: coronary arteriograms for the imaging of arteries for the muscular tissue of the heart, or myocardium, which arteries together form the coronary tree; peripheral arteriograms for visualization of the feeding of the lower and upper members; cerebral arteriograms. By way of example, coronary arteriograms will be concerned hereinafter. Stenoses are local strictures which are caused by partial or total obstruction occurring in the arteries. In the coronary tree, stenoses seriously hamper the feeding of the myocardium and must be detected by a radiologist on the basis of arteriograms.

The introduction in recent years of digital radiography, combining the use of an X-ray detector providing a real-time image and the digitization of the images, constitutes a major advance in the field of imaging in comparison with conventional radiography. It actually gives access to numerous possibilities offered by the digital image processing techniques.

Other methods of forming angiographic images are also known, for example the methods utilizing magnetic resonance.

The invention, however, depends neither on the method whereby the digital image has been obtained nor on the nature of the objects reproduced therein, but relates exclusively to the processing of the digital image in order to determine the central points and the edge points of the objects represented, provided that these objects constitute sufficiently uniform, contrasting masses on a sufficiently uniform background.

A method for the automated identification of the contours of vessels in coronary arteriograms is known from the publication "Automated Identification of Vessel Contours in Coronary Arteriograms by an adaptive Tracking Algorithm", by Ying Sun, published in IEEE Transactions on Medical Imaging, Vol. 8, No. 1, March 1989. The cited document describes an algorithm which is referred to as "tracking" of the central line of the vessels in order to identify the contours of these vessels in the digitized arteriograms. The algorithm essentially comprises three steps:

1) The identification of points situated on the central line of a vessel. Each point of the central line has three attributes: its position, the direction of a vector parallel to the direction of the vessel segment whereto the point belongs, and the half-width of the vessel at this point. Given a starting point $P_k$ on the central line of the vessel, the algorithm calculates a point $\tilde{P}_{k+d}$ at a given distance d in the direction of the attribute vector of the starting point $P_k$. Subsequently, convolution filtering is performed by means of a rectangular filter having a principal orientation perpendicular to said vector, i.e. parallel to the scanning direction at the starting point $P_k$.

This filtering operation enables identification of a given point $P'_{k+d}$, which is determined by performing the convolution between the density profile along the scanning line passing through the point $\tilde{P}_{k+d}$ and an ideal density profile of rectangular shape. The convolution results in a vector for which the maximum value is searched, which maximum value relates to a pixel which corresponds to the maximum of the density profile and enables the updating of the new point $P'_{k+d}$.

2) The identification of edges of the vessel: the edges of the vessel which correspond to the new point $P'_{k+d}$ are identified as the position of the points of inflection on a transverse density profile, i.e. perpendicularly to an attribute vector of the point $P'_{k+d}$ resulting from an updating operation. The half-width of the vessel is thus updated, after which the new point $P'_{k+d}$ of the central line searched is finally identified.

The process is repeated for all points situated on the scanning lines perpendicular to the first attribute vector of the starting point $P_k$: from k+1 to k+d. This directional vector is maintained so as to be the same for the entire distance d.

In the case of a bifurcation, the process selects the branch of the vessel having the highest density, so that the updated density profile does not exhibit a double peak.

3) Spatial averaging: this "tracking" operation produces a description of the vessel with N inputs. Each input is characterized by a triplet: position of a point on the central line of the vessel; direction of a vector parallel to the central line in a segment of length d, chosen as a function of the curvature of the vessel; half-width of the vessel at this point.

A first technical problem encountered in the processing of arteriograms is the detection of all pathological conditions and the elimination of false alarms.

The pathological conditions to be detected concern not only the stenoses appearing in the form of a local stricture in a vessel which thus simply exhibits a local minimum of the width. The pathological conditions also concern a type of stricture which is referred to as a "step" which appears, in a vessel having a substantially uniform first width, as an abrupt transition to a second width which is smaller than the first width. This type of "step" may signify that a vessel is concerned which referred to as a principal vessel of a first width which branches into two vessels, one of which has a second width and is still visible in the prolongation of the principal vessel, whereas the other vessel is completely occluded as from the point where it is branched from the principal vessel and has disappeared, i.e. become completely invisible in the arteriogram.

The single means of detecting such a completely occluded and hence invisible vessel is to detect the "stepped" stricture in the principal vessel.

The latter pathological condition cannot be recognized by the algorithm described in the cited state of the art. Thus, the known method is not capable of distinguishing the case where a "step" occurs due to the fact that after branching one of the two secondary vessels has completely disappeared, being a serious pathological case, from the non-pathological case where a natural bend occurs in the vessel. As the characteristic "step" shape is the only alarm enabling a radiologist to uncover the occluded vessels, this type of algorithm does not enable the radiologist to detect these pathological conditions which are large in number as well as serious in respect of the condition of the patient.

A second technical problem encountered resides in the implementation of medical imaging systems provided with means for the fully automatic detection of the pathological conditions described above, i.e. the first condition involving local strictures of vessels, and the second condition involving "stepped" strictures. Fully automatic detection is to be understood to mean that the detection of the pathological conditions must be carried out without assistance from an operator.

The formation of angiograms assumes that a patient, usually awake, is injected, for example with a contrast medium by means of a catheter via the femoral artery; subsequently, an operator makes a number of exposures of the coronary tree in the form of a sequence of video images, for example at a rate of 30 images per second. Such a sequence enables the display of several cardiac cycles. The stenoses or strictures described above are the principal anomalies to be detected. However, such detection may be hampered by an unfavorable orientation of the vessels or the course of a background vessel behind a vessel situated in the foreground. Therefore, it is necessary to utilize different projection angles and also to attempt detection of the stenoses in all images of the video sequence for which the concentration of the contrast medium is sufficiently strong to ensure good visibility of the vessels.

Thus, there are many of these images and the radiologist makes his diagnosis while studying these images as they slowly pass by. Thus, there appears to be a need to detect, in advance and automatically, the pathological conditions mentioned above. Psychologically speaking, the radiologist tends to have his attention drawn to the most flagrant pathological conditions, and to ignore given situations which are less visible but which may be more disturbing or serious, from a clinical point of view, for the care of the patient. The radiologist may also let given pathological conditions pass because they appear only in a single image, or in only a few images of the sequence.

Therefore, it is important that the radiologist has available a system for revealing pathological conditions so that his attention is drawn to image areas, or the areas of the single or a few images of the sequence which contain actually the most interesting information which is indispensable for examination. Attention could thus be drawn to the a priori less likely areas nevertheless containing pathological conditions; moreover, his attention could be drawn away from the focusing on a few stenoses which are evident but without major importance from a point of view of further medical treatment.

Such full automation of the detection of the pathological conditions is not achieved by means of the algorithm known from the cited document.

SUMMARY OF THE INVENTION

It is an object of the present invention to propose a method which is capable of fully automatically detecting at least the first and the second type of pathological conditions described above.

In accordance with the invention, this object is achieved by means of a method as defined in the preamble, characterized in that it also comprises a step for the detection of stenoses by measurement of the intensities of pixels along the central lines of the vessels, which step comprises a sub-step for deciding whether a pixel zone is a potential stenosis zone when the intensity of its pixels exhibits a local variation so as to assume an intermediate value between the intensity of the pixels to both sides of this zone and the intensity of the pixels of the background of the image, a sub-step for defining an icon around potential stenosis zones, and a sub-step for the extraction of the pixels of edges of the vessels in the icons.

It is also an object of the invention to provide a system which is capable of eliminating the errors automatically and as well as possible. There are two types of feasible errors in the detection of stenoses: positive errors and negative errors. A positive error, or false alarm, is to be understood to mean a falsely detected stenosis, i.e. the identification of a zone as containing a stenosis whereas the localized zone in reality contains a vessel without any stenosis, or the identification of a zone as containing a stenosis whereas it contains an element other than a vessel. A negative error is to be understood to mean a non-detected stenosis, that is to say the non-identification of a zone containing a pathological condition.

In accordance with the invention, this object is achieved by means of the method which is characterized in that it also comprises a step for determining the seriousness of the stenoses and for determining the false alarms and is carried out by a neural network which supplies, for each potential stenosis, the probability that it concerns a real stenosis or a false alarm.

BRIEF DESCRIPTION OF THE DRAWING

The invention will be described in detail hereinafter with reference to the accompanying diagrammatic drawings; therein.

DETAILED DESCRIPTION OF THE PREFERRED EMBODIMENTS

Figure 1:
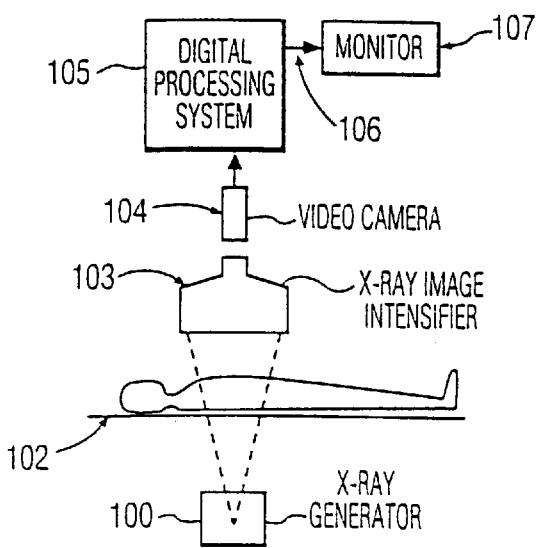
FIG. 1 shows a digital radiography system.

Referring to FIG. 1, a digital radiography system comprises an X-ray generator 100, a mobile table 102 for a patient, and an image intensifier device 103 which is coupled to a video tube or camera 104 which applies data to a digital image processing system 105 which comprises a microprocessor. The latter comprises several outputs, an output 106 of which is coupled to a monitor 107 for the display of the radiographic image.

The digitized radiographic image may comprise, for example 512×512 pixels or 1024×1024 pixels, coded in 8 grey levels or intensity levels, where the lowest intensity level corresponds to the darkest regions.

Figure 2:
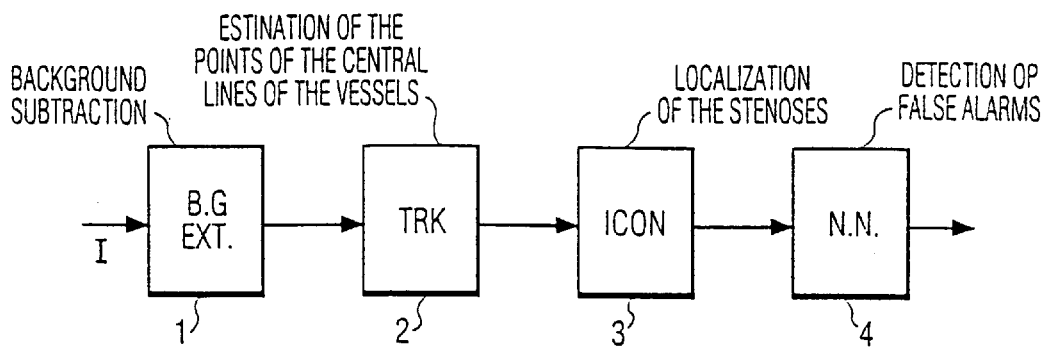
FIG. 2 shows a diagram of functional blocks, corresponding to the various steps of the invention.

The invention proposes a method of processing digital images, the various steps of the method being represented by functional blocks in the diagram of FIG. 2. The method aims to detect stenoses of a first type which consist of local strictures of the vessels, and stenoses of a second type which consist of "stepped" strictures. The method can also be extended to the detection of any other anomalies as may become relevant as medical knowledge advances.

Figure 3A:
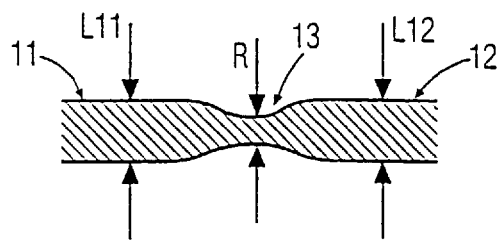
FIGS. 3A and 3B show vessels with different types of stenoses.

Referring to FIG. 3A, a stenosis of the first type consists of a local stricture of a vessel which has a first width L11 in a region 11 and subsequently exhibits a zone 13 of much smaller width R over a small length, and then has a second width L12 in a region 12 which is almost equal to the first width L11. This pathological condition corresponds to a partial, local occlusion of the vessel.

Figure 3B:
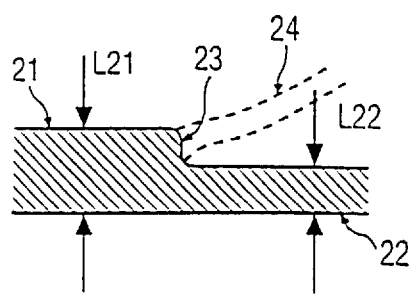

Referring to FIG. 3B, a stenosis of the second type consists of an abrupt and prolonged stricture 23 in a vessel which has a first width L21 in a region 21, and subsequently abruptly changes over to a second width L22, smaller than the first width L21, in a region 22. This pathological condition corresponds to complete occlusion of a vessel 24, which is denoted by dashed lines, connected to the parts 21 and 22 of the vessel by a branch at the area 23, and which has completely disappeared in the images.

Referring to FIG. 2, the image processing method comprises the following steps:

STEP 1: SUBTRACTION OF THE BACKGROUND

This step corresponds to the functional block 1 of the diagram of FIG. 2.

For each image I of the sequence a logarithmic compression of the scale of the intensities is executed. In the case of an X-ray image, the intensities of the pixels thus transformed become proportional to the absorption of the X-rays by the objects in the image. The vessels appear as dark structures on a brighter background.

The background of the image is then extracted by means of a morphological closing operation (denoted as B.G.Ext. in FIG. 2) by utilizing a three-dimensional structuring element as indicated in the aforementioned contemporaneously filed application. More specifically, a region of the image is considered to form part of the background either because its intensity varies very slowly in space, or because the contrast of the objects of small width present therein is the inverse of that of the vessels (i.e. light on a dark background). The background thus evaluated is algebraically subtracted from the image so as to obtain a new image in which the contrast of the vessels is strongly enhanced. Subsequently, the noise subsisting in the background of the image is reduced by way of a dynamic thresholding operation.

In respect of the morphological closing operation by means of a structuring element, reference is made to the publication "Optimization of Morphological Structuring Elements for Angiogram Enhancement", by Keith M. Andress and David L. Wilson, published in SPIE, Vol. 1445, Image Processing, 1991, pp. 6–10.

Figure 4A:
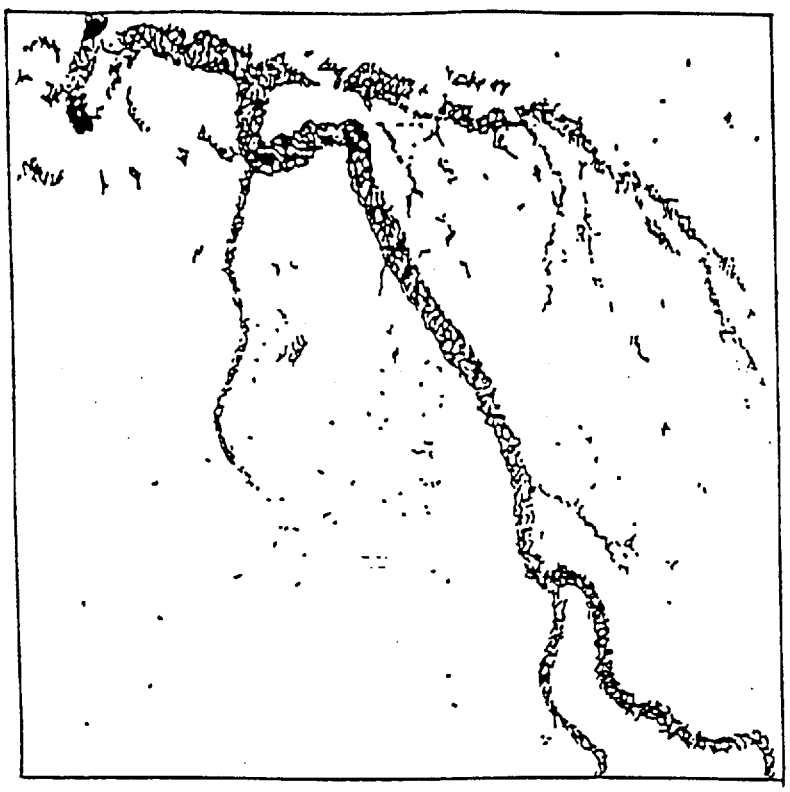
FIG. 4A shows the image of the coronary tree after extraction of the background.

At the end of this first step the image in principle contains only the coronary tree as shown by way of example in FIG. 4A. In the digital image of FIG. 4A the vessels appear as dark bands on a substantially blank background.

The digital image processing method subsequently comprises the following successive fundamental steps: accurate estimation of the points of the central lines of the vessels; detection of the potential pathologies; determination, restricted to the pathological regions, of the edges of the vessels on the basis of the accurate knowledge of the points of the central lines; determination and rejection of false alarms.

The entire method not only aims to assist the radiologist in the localization of the various pathologies and the rejection of false alarms, but also to enable full automation of this operation.

STEP 2: ESTIMATION OF THE POINTS OF THE CENTRAL LINES OF THE VESSELS

This step, represented by block 2 in FIG. 2 and denoted by TRK (tracking) in block 2, is chosen from among the methods capable of achieving accurate determination of the coordinates of the points or pixels located on the central lines or medians of the vessels, which lines form the skeleton of the coronary tree as is known to those skilled in the art.

The choice of the method of determining the skeleton of the coronary tree is left to those skilled in the art. For example, use will be made of the method disclosed in French Patent Application No. 94 01770, filed Feb. 16, 1994, which corresponds to commonly-owned U.S. patent application Ser. No. 08/388,864, filed Feb. 15, 1995, and entitled "Image processing method for determining locally the centre and semi-width of objects contrasted against a background and arrangement for implementing this method," or the method described in French Patent Application No. 93 09055, filed Jul. 22, 1993 which corresponds to the aforementioned U.S. Patent Application having the same inventor as and filed contemporaneously with this application.

Figure 4B:
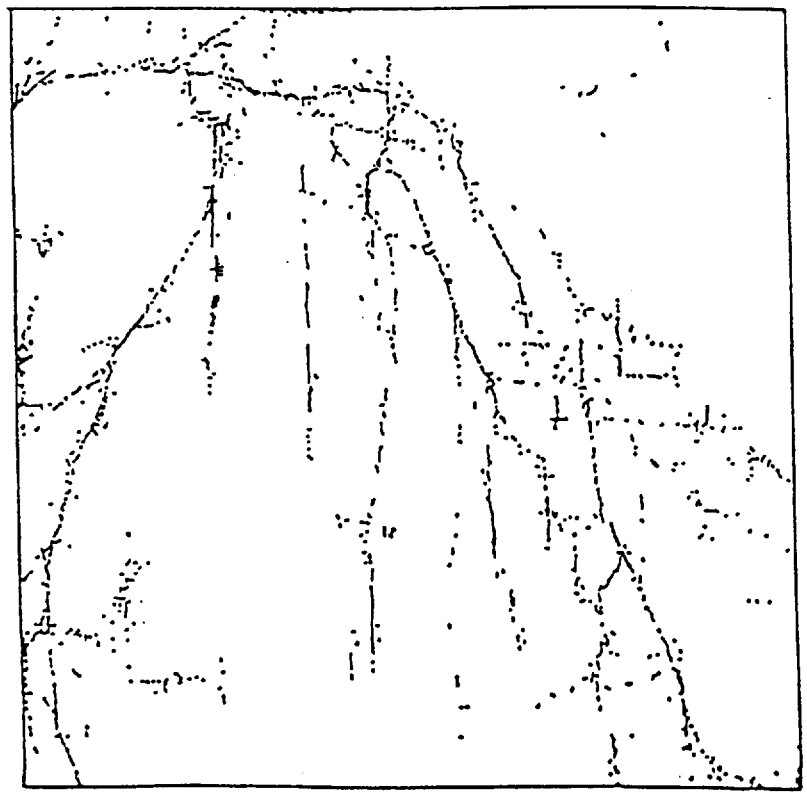
FIG. 4B shows it after extraction of the pixels of the central lines (tracking)

The skeleton of the coronary tree thus appears as shown in FIG. 4B and is formed exclusively by points, resulting from the operation executed, during this step 2, on the angiographic image of FIG. 4A, said points being located on the median lines of the blood vessels and their intensity now being an accurate data which is available as a function of the coordinates of these points in the digital image processed.

During this step, those skilled in the art will not be interested in the localization of the contour points of the vessels, but only in the single skeleton of the vessels. However, the accurate methods are to be preferred.

STEP 3: LOCALIZATION OF THE STENOSES

At this stage, if there are no stenoses along the median line of the vessels, the intensity response should normally be substantially uniform and strong. However, if a stenosis exists, the intensity at the area of the stenosis in the vessel increases, at the area of the stenosis, instead of appearing as a substantially black band on a clear background, the vessel then exhibits a level between this black level and the clear background. Evidently, if the expert has chosen a method representing the vessel as a blank on a black background, the result is reversed, i.e. for a blank vessel, i.e. a vessel of high-intensity, this intensity diminishes in the case of a stenosis and the zone of the stenosis tends towards grey, so again an intermediate intensity between that of the vessel and that of the background.

In all cases, this has an effect on the intensity of the central point of the vessel at the area of the stenosis. In the exemplary case where the vessel is black, the intensity of the point, or the points, situated on the median line of the vessel at the area of the stenosis is then higher than that of the points situated on this median line downstream and upstream from the area of the stenosis.

During this step 3, represented by the block 3 of FIG. 2, the intensity of the points situated on the median line of the vessels is, therefore, examined and the points which exhibit a local variation, i.e. a local increase of the intensity in the present example, are identified as relating to a potential stenosis zone or zones.

Figure 5A:
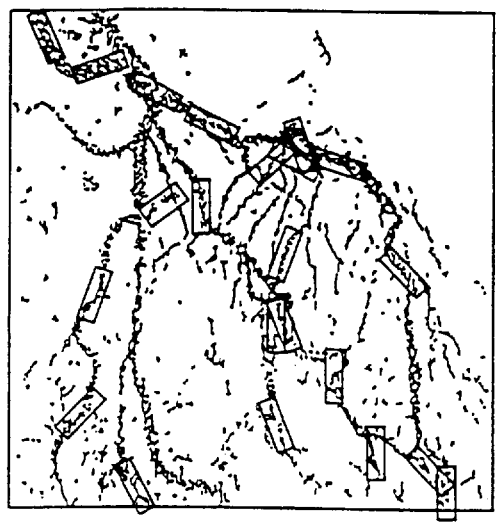
FIG. 5A shows the regions of detected stenoses marked by rectangular boxes in a coronary tree (23 stenoses) and FIG. 5B shows, in the same coronary tree image, the regions of stenoses retained after the step involving neural detection and elimination of false alarms (5 stenoses retained)

These potential stenoses zones are revealed in the digital image by visual marks which are known to the expert, for example crosses whose branches encircle the stenosis zone, or circles encircling these zones, or rectangles whose major axis extends parallel to the central line of the vessel and which enclose these zones as shown in FIG. 5A. The image of the region or vessel segment thus encircled or enclosed is referred to hereinafter as "icon".

At this stage of the image processing method (denoted as ICON in FIG. 2), therefore, the number of points of the image to be examined has been substantially reduced. Actually, if a full-resolution image of 512×512 pixels is examined, initially all points are suspect, so that there are approximately 260,000 suspect points. At this stage of the invention, where only remains the points localized in the icons (FIG. 5A), still need be examined, the number of suspect points has been reduced to approximately from 200 to 1000.

At this stage of the method, therefore, the vessels are individually examined in the "icons", each icon normally containing only a vessel segment. Via a segmentation operation, the edges of this vessel are then detected in each "icon". The icon is first related to its own coordinate axes. Subsequently, the edges of the vessel are determined, for example by calculating the derivative of the intensity profile perpendicular to the axis of the central line of the vessel in the icon. The edge point of the vessel is then retained as that point where an inflection of the intensity curve occurs. The edge lines of the vessel contained in each "icon" are detected, via a regrouping operation performed on the edge points.

According to another method of detecting the edges of the vessel, the correlation of the intensity profile transversely of the vessel with crenellations (arch shapes) of different width can be searched.

Because of this step, the method of the invention differs substantially from the known method which determines all edges of all vessels of the full-resolution image in order to enable identification of the points situated on the central line. The method in accordance with the invention, therefore, is very economical in respect of calculations, because the edges are detected only in the icons.

The seriousness of the stenoses is subsequently determined. To this end, once the edges of the vessel have been determined, the minimum distance existing between the edges of the vessel in this icon are determined by examining the intensity profiles. At that instant a decision is made so as to indicate whether the stricture actually corresponds to an anomaly.

STEP 4: DETECTION OF FALSE ALARMS

This step is represented by the block 4 in FIG. 2 (denoted as N.N).

All situations leading to stenoses are indexed as well as all situations leading to false alarms, for example the abrupt changes of direction of the vessels, given branchings etc. In this step there is a human aspect, i.e. a manual aspect, for carrying out a supervised neural learning phase.

4-1 Training of the neural classifier.

This task is performed once by the person or teacher developing the algorithm. A single neural network suffices for a large number of video sequences from similar acquisition systems. In order to carry out the supervised learning of the classifier, a group of individual images is selected. An interactive graphic interface enables the teacher to localize, for each of these images, a set of rectangular regions containing real stenoses or typical false alarms. Each of these rectangular regions thus defined receives a label encoding the category of the object which can be detected within the rectangular window.

These categories contain from the most benign stenoses to the most severe stenoses (categories 1 to 5) as well as the typical situations which may give rise to false alarms (categories 6 to 12). The categories corresponding to typical false alarms are:

a vessel neighboring a branching point and giving rise to incorrect estimation of its orientation, a normal vessel with a small apparent stricture, an extremity of a normal vessel, a vessel with a local curvature in an plane orthogonal to the image, a candidate stenosis detected within the aorta, a normal vessel with a local curvature in the plane of the image, a linear detail of the background which is detected as a vessel with a stenosis.

4-2 Neural network for the elimination of false alarms.

For the elimination of false alarms use is made of a neural network with a hidden layer and two outputs. The input of the neural network receives a vector whose components are characteristic traits of a candidate stenosis detected by means of the above method. This vector may be formed, for example by the intensities of the pixels of the icon of the candidate stenosis. The two outputs of the neural network encode the lass of the non-stenoses (output 1) and that of the stenoses (output 2), respectively. Once reduced to the interval (0,1) by fine transformation, the two activations of the output of the network can be interpreted as probabilities of association with either the class 1 or the class 2, given the vector of characteristic traits (probabilities a posterior). These two probabilities are stored for each of the candidate stenoses. This enables the operator himself to define the degree of reliability, on a scale of probability, so as to retain or reject a candidate stenosis. The storage of the probabilities enables the user to try out several reliability levels without having to repeat the entire procedure for the detection and recognition of stenoses as described above. A graphic display method visualizes the stenosis retained in each of the individual images.

Figure 5B:
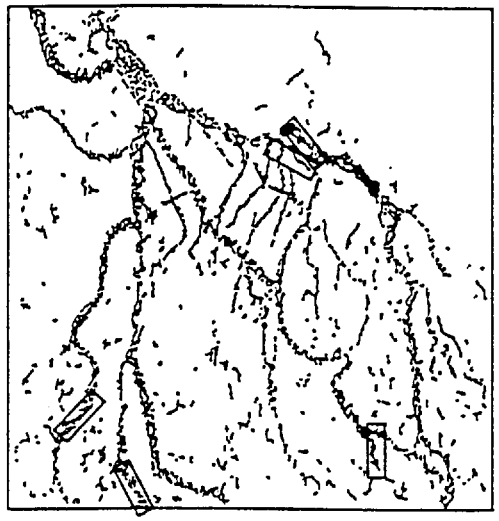

Referring to FIG. 5, it appears that 25 stenoses have been retained at the end of step 4 in FIG. 5A. After the neural treatment of the step 4, only 5 stenoses will be retained as shown in FIG. 5B.

4-3 Statistical analysis of the neural classification.

Figure 6:
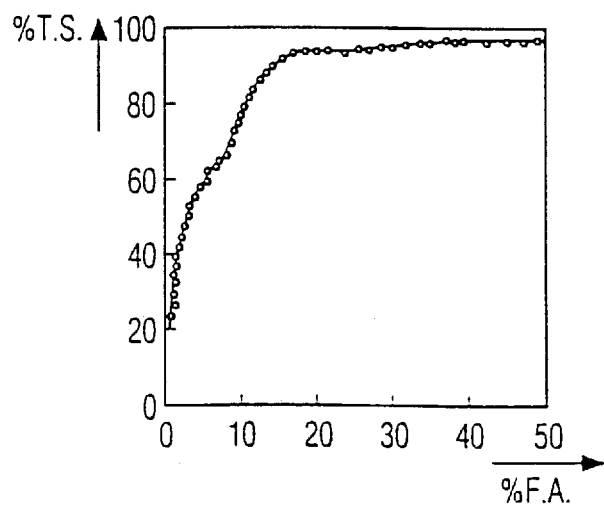
FIG. 6 shows the ROC curve (Receiver Operating Curve).

FIG. 6 shows the curve ROC (Receiver Operating Curve) which summarizes the statistical performance of the neural classifier. Each point of this curve corresponds to a different choice of the stenosis reliability level (SRL). The value of SRL can be controlled by use between 0 and 1. When SRL approaches is fired to a value near unity (for example, 0.85), the neural classifier will retain only the most evident stenosis; in that case the false alarm rate F.A. will be very low (horizontal axis), be it at the expense of a modest recognition rate (vertical axis) for the true stenoses T.S. The opposite situation corresponds to a low value of NCS (for example, 0.6). It appears that the true stenoses V.S not recognized correspond in majority to the most benign stenoses. The vessels with a local curvature in a plane orthogonal to the image cause the largest number of false alarms F.A.

The use of a neural network for the image processing method in accordance with the invention thus enables statistically satisfactory results to be obtained for the automatic detection of stenoses, i.e. without assistance from an operator.

I claim:

1. A digital angiography method comprising acquiring a digital angiographic image representing vessels on a background, and automatically performing the following steps in an image processing system:

identifying pixels of the digital angiographic image situated on median lines of vessels, referred to as median pixels;

examining intensity values at the identified median pixels;

identifying vessel segments corresponding to median pixels exhibiting a local variation of intensity with respect to median pixels situated upstream and downstream on the same median line, as potential stenosis zones;

subsequent to said identifying potential stenosis zones, extracting pixels at edges of the vessel segments only in said potential stenosis zones;

identifying strictures in said vessel segments in said potential stenosis zones based on the locations of extracted pixels at edges of the vessel segment;

determining for each potential stenosis zone, upon characteristics including the intensity of median pixels and distance between edges of the vessel segment in said potential stenosis zone at an identified stricture, whether or not the identified stricture is a true stenosis; and providing the digital angiographic image to a display device including markings identifying true stenoses.

2. A method as claimed in claim 1, wherein the step of determining whether or not an identified stricture within a potential stenosis zone is a true stenosis or not is carried out by a neural network which supplies, for each potential stenosis zone, the probability that it contains a true stenosis or a false alarm.

3. A method as claimed in claim 2, wherein the pixels of the edges of the vessels are extracted by correlating intensity profiles perpendicularly to the axis of the median line of the vessel segments in the potential stenosis zones with crenellations.

4. A method as claimed in claim 2, wherein the edges of the vessel segments in a potential stenosis zone which correspond to each point of the median line are determined as points of inflection of the corresponding intensity profile, perpendicularly to the median lines of the vessels, by calculation of the derivative of this intensity profile.

5. A method as claimed in claim 1, wherein the identifying of median pixels is preceded by a step of extracting the background so as to produce the image of the vessels as contrasting objects on a substantially uniform background.

6. A method as claimed in claim 2, wherein the identifying of median pixels is preceded by a step of extracting the background so as to produce the image of the vessels as contrasting objects on a substantially uniform background.

7. A method as claimed in claim 3, wherein the identifying of median pixels is preceded by a step of extracting the background so as to produce the image of the vessels as contrasting objects on a substantially uniform background.

8. A method as claimed in claim 4, wherein the identifying of median pixels is preceded by a step of extracting the background so as to produce the image of the vessels as contrasting objects on a substantially uniform background.

* * * * *